United States Patent
Heimann et al.

(10) Patent No.: US 9,976,587 B2
(45) Date of Patent: May 22, 2018

(54) COUPLING CONSISTING OF COUPLING BOLT AND HOLDER AS WELL AS METHOD FOR CONNECTING A FIRST AND A SECOND COMPONENT BY MEANS OF THE COUPLING

(71) Applicant: BÖLLHOFF VERBINDUNGSTECHNIK GMBH, Bielefeld (DE)

(72) Inventors: Vanessa Heimann, Paderborn (DE); Alexander Vorderwisch, Bielefeld (DE)

(73) Assignee: BÖLLHOFF VERBINDUNGSTECHNIK GmbH, Bielefeld (DE)

( * ) Notice: Subject to any disclaimer, the term of this patent is extended or adjusted under 35 U.S.C. 154(b) by 0 days. days.

(21) Appl. No.: 15/160,028

(22) Filed: May 20, 2016

(65) Prior Publication Data
US 2016/0341235 A1    Nov. 24, 2016

(30) Foreign Application Priority Data
May 20, 2015    (DE) .......................... 10 2015 108 007

(51) Int. Cl.
*F16B 21/09*    (2006.01)
*F16B 21/07*    (2006.01)
*F16C 11/10*    (2006.01)

(52) U.S. Cl.
CPC ............ *F16B 21/09* (2013.01); *F16B 21/078* (2013.01); *F16B 21/073* (2013.01); *F16C 11/106* (2013.01);
(Continued)

(58) Field of Classification Search
CPC ..... Y10T 403/32032; Y10T 403/32311; Y10T 403/32565; Y10T 403/32573;
(Continued)

(56) References Cited

U.S. PATENT DOCUMENTS 2,332,504 A * 10/1943 Brenner ................. F16M 11/14
    248/181.1
3,851,979 A * 12/1974 Becker ..................... F16L 3/14
    248/62

(Continued)

FOREIGN PATENT DOCUMENTS

DE    1807371 A1    6/1969
DE    102010000260 A1    8/2011
(Continued)

OTHER PUBLICATIONS

EP Search Report for EP Application No. 16169029.2 dated Oct. 6, 2016, 7 pages.

*Primary Examiner* — Josh Skroupa
*Assistant Examiner* — Cory B Siegert
(74) *Attorney, Agent, or Firm* — Reising Ethington P.C.; Matthew J. Schmidt

(57) ABSTRACT

Coupling by means of which a first and a second component are connectable to each other, having the following features: a coupling bolt having a fastening end, a holding head and a supporting section arranged therebetween, in which the holding head and the supporting section are connected to each other by means of a web, which is tapered with respect to the holding head, and the fastening end is fastenable at the first component, a holder having a keyhole and an abutting portion, in which an edge of the keyhole encloses a non-planar surface, the coupling bolt is lockable in the keyhole in a form-fit manner by means of an inserting-pivoting-
(Continued)

Figure 1:
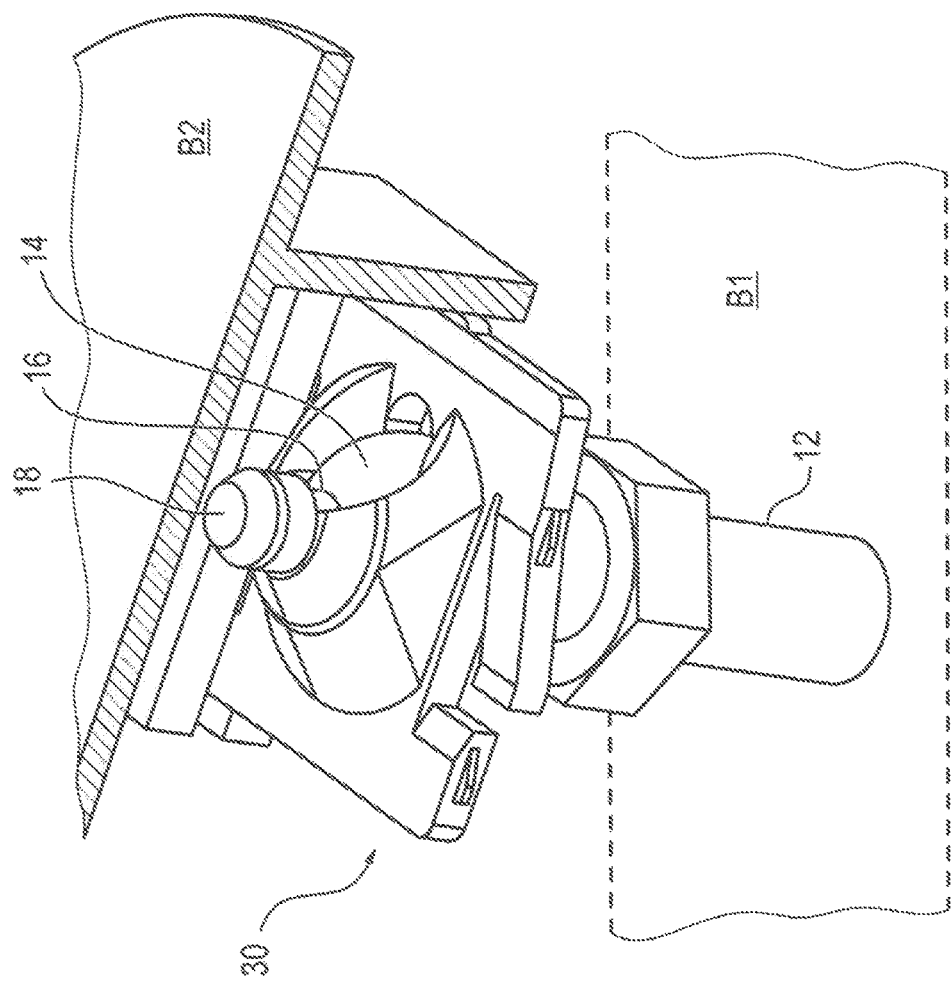

movement and the holder is fastenable at the second component by means of a fastening structure.

10 Claims, 16 Drawing Sheets

(52) U.S. Cl.
CPC .................. *Y10T 403/32565* (2015.01); *Y10T 403/32573* (2015.01)

(58) Field of Classification Search
CPC ..... Y10T 403/32631; Y10T 403/32737; Y10T 403/32795; F16B 21/073; F16B 21/078; F16B 21/09; F16C 11/0604; F16C 11/0638; F16C 11/0647; F16C 11/069; F16C 11/10; F16C 11/103; F16C 11/106; F16C 11/0623; F16C 11/0642; F16C 11/0628; F16C 11/0633
USPC ............. 403/56, 90, 114, 115, 122, 135, 142
See application file for complete search history.

(56) References Cited

U.S. PATENT DOCUMENTS

| | | | |
|---|---|---|---|
| 3,988,808 A * | 11/1976 | Poe | ................ F16B 21/02 24/297 |
| 4,697,777 A * | 10/1987 | Yang | ................ F16M 11/10 248/343 |
| 6,736,852 B2 * | 5/2004 | Callaway | ............... A61F 2/4684 403/119 |
| 7,114,221 B2 * | 10/2006 | Gibbons | ................ F16B 5/065 24/289 |
| 7,168,879 B2 | 1/2007 | Bertram et al. | |
| 7,384,209 B2 * | 6/2008 | Muders | ............... F16C 11/0614 248/288.31 |
| 7,510,160 B1 * | 3/2009 | Wang | ................ F04D 25/088 248/288.31 |
| 8,894,316 B2 * | 11/2014 | Kailas | ................ F16M 11/14 403/90 |
| 9,140,294 B2 * | 9/2015 | Burton | ................ F16C 11/06 |
| 2015/0232016 A1 | 8/2015 | Burton | |

FOREIGN PATENT DOCUMENTS

| DE | 102013102197 A1 | 9/2013 |
|---|---|---|
| EP | 1416172 B1 | 12/2005 |

* cited by examiner

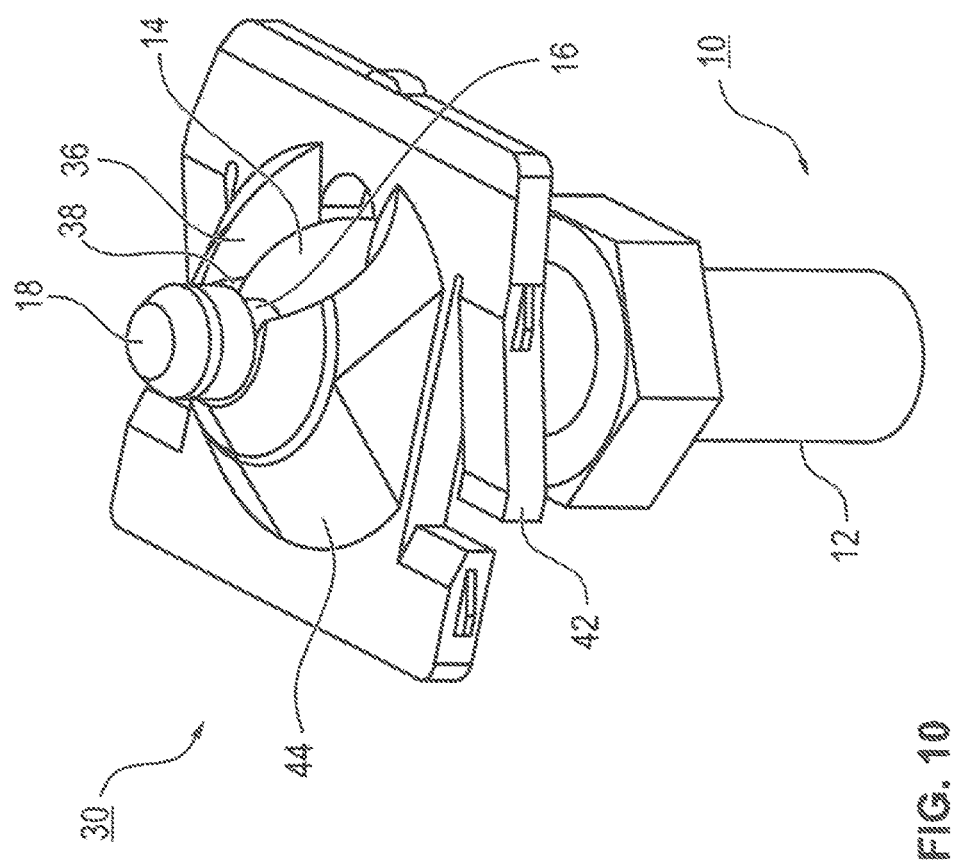

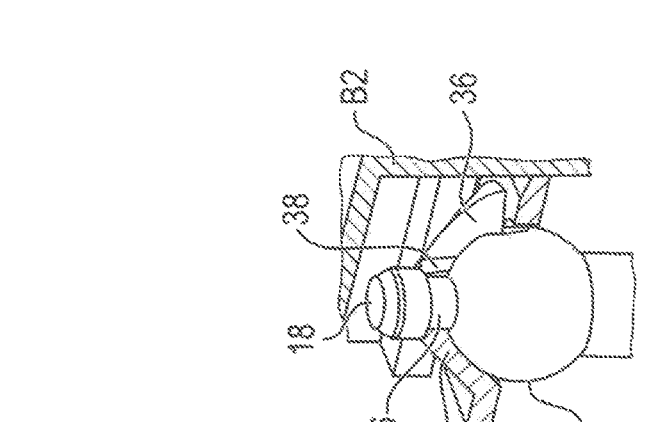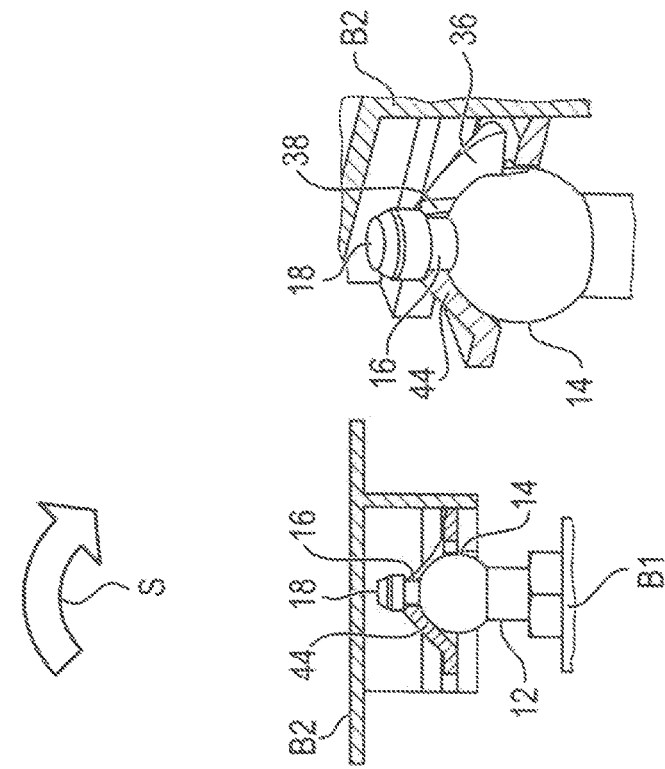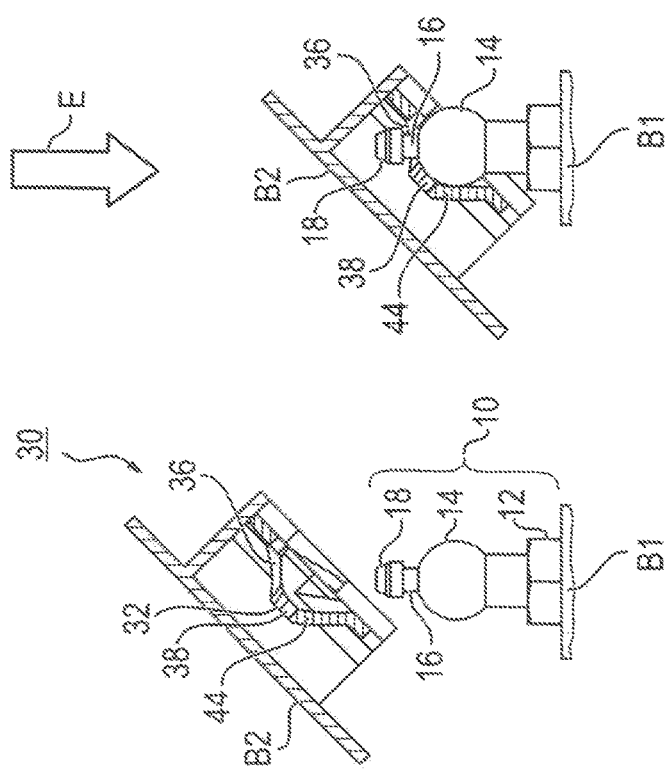

COUPLING CONSISTING OF COUPLING BOLT AND HOLDER AS WELL AS METHOD FOR CONNECTING A FIRST AND A SECOND COMPONENT BY MEANS OF THE COUPLING

1. CROSS REFERENCE TO RELATED APPLICATIONS

This application claims the priority of German patent application No. DE 10 2015 108 007.9, filed on May 20, 2015. The entire content of this priority application is incorporated herein by reference in its entirety.

2. TECHNICAL FIELD

The present application relates to a coupling by means of which a first and a second component are connectable to each other. Further, the present application relates to a coupling bolt and a holder which form the above-mentioned coupling based on their interaction or cooperation. Further, the present application is directed to a method for connecting a first and a second component by means of this coupling which acts positively or in a form-fit manner.

3. BACKGROUND

In the prior art, different plug-in couplings are known which consist of a coupling element and a ball pin or ball bolt. The coupling element comprises a ball socket into which the ball head of the ball pin snaps. In this way, a connection between coupling element and ball pin is created. As the coupling element often consists of elastomeric, thus flexible, material and/or the ball socket is arranged movably in the coupling element to a certain degree, vibrations of the components may be damped with these plug-in couplings.

EP 1 416 172 B1 describes such a construction of a plug-in coupling supporting the damping of component vibrations. For this purpose, the ball socket receiving the ball head is fastened at a circumferentially arranged wave-shaped web. This wave-shape of the web makes a movement of the ball socket in an arbitrary spatial direction possible so that movements between the components are damped.

These vibration damping couplings have, however, the disadvantage that the holding forces between coupling element and ball pin are limited due to the damping material properties of coupling element and/or ball pin. Due to this, such plug-in couplings are not suitable for mechanically highly loaded connections, for example. Thereto belong, beside others, combustion engines having a large volume or electric motors for the mechanical vibrations of which or, in general, for the mechanical loads of which the releasing forces between ball head and ball socket of the coupling element would be insufficient. From this, the disadvantage follows that, for example, covers or claddings in the engine compartment may be released from their plug-in connection due to the vibrations which are present there.

For increasing the holding forces between coupling element and ball pin, i.e. for realizing higher extraction forces, DE 10 2013 102 197 A1 describes another coupling construction. The here used ball pin engages in the construction of a coupling element, the individual holding webs of which are inclined against an insertion direction of the ball pin into the ball socket. Due to the inclination of these webs and due to the engagement point of the individual webs at the ball head, the webs prevent a releasing of the ball head from the ball socket with low extraction forces. Because the webs are compressed and/or moved in the direction of the insertion opening of the coupling element during an extraction movement. Due to this pivoting movement of the webs, the opening of the coupling element is partly blocked which prevents a releasing of the ball head. Despite the high extraction forces of this coupling, it is disadvantageous that the connection between coupling element and ball head cannot be released without destruction. Thus, for example claddings in the motor compartment are held reliably but each removing of a cladding part destroys the coupling element. For this reason, the coupling element has to be replaced each time which causes additional work and cost effort.

It is therefore an object of the present disclosure to provide an alternative coupling with respect to the prior art which realizes sufficient high releasing forces and is thus mechanically loadable. At the same time, the coupling shall be releasable without destruction to ensure the required flexibility especially during maintenance work.

4. SUMMARY

The above object, among others, is solved by a coupling by means of which a first and a second component are connectable to each other according to independent patent claim 1, by a coupling bolt for this coupling according to independent patent claim 12, by a holder for this coupling according to independent patent claim 14 as well as by a method for connecting a first and a second component by means of the coupling according to independent patent claim 21. Advantageous embodiments and developments result from the following description, the accompanying drawings and the appending claims.

The coupling by means of a which a first and a second component are connectable to each other comprises the following features: a coupling bolt comprising a fastening end, a holding head and a supporting section arranged therebetween, in which the holding head and the supporting section are connected to each other by means of a web which is tapered with respect to the holding head, and in which the fastening end is fastenable at the first component, a holder having a keyhole and an abutting portion, in which an edge of the keyhole encloses a non-planar surface, the coupling bolt is lockable in the keyhole positively or in a form-fit manner by means of an inserting-pivoting-movement and the holder is fastenable at the second component by means of a fastening structure.

The connection between coupling bolt and holder is not solely created by a linear inserting or plug-in movement. Rather, a combination of a linear and a pivoting movement takes place to create a positive or form-fit connection between the coupling bolt and the keyhole of the holder. For this purpose, the coupling bolt comprises a holding head which locks in the keyhole, preferably after the pivoting movement is completed. The supporting section, which is also provided at the ball bolt, preferably at least partly abuts the holder as soon as the holding head has been inserted in the keyhole and/or after it has been locked therein. Thereby, the mechanical loads are transferred between the supporting section of the coupling bolt and the abutting portion of the holder and, thus, between the components. The abutting portion extends namely in the adjacence of the keyhole so that the locking of the holding head in the keyhole makes the supporting section abutting the abutting portion. The form-fit connection between keyhole and holding head and thus between holder and coupling bolt resists maximum extraction forces. Because these maximum extraction forces from the keyhole are determined by the material stability of the holder and/or the coupling bolt as only an extracting would be possible that destroys the holder or the coupling bolt. Because the coupling bolt is connected to the first component by means of its fastening end and the holder is fastened at the second component by means of its fastening structure, a reliable connection between first and second component is realized by the connection between coupling bolt and holder at the same time.

According to a further embodiment, the keyhole comprises an inserting section and a locking groove in which the inserting section forms a through-passage portion for the holding head of the coupling bolt, and a width of the locking groove is smaller than a diameter of the holding head and larger than a thickness of the tapered web.

The keyhole already described above encloses with its edge a non-planar surface. This means that the keyhole is arranged in an areal portion of the holder which does not lie in one plane. Such an areal portion is for example formed by a later surface of a ball segment, a ball socket, a conical lateral surface or by an arbitrarily curvilinear domed lateral surface. The keyhole which is cut out from this lateral surface consists of the arbitrarily formed inserting section and the adjoining locking groove. The inserting section must have a sufficient extension so that the holding head may be moved through this inserting section. On the other side, the inserting section must be sufficiently small so that the supporting section may just not move through the inserting section.

Advantageously, the holding head and the supporting section are spaced from each other by the tapered web, the width of which is adapted to the width of the locking groove. As the locking groove is just sufficiently wide to be able to receive the tapered web, the coupling bolt is held in the locking groove. Because the holding head and the supporting section are each wider in their lateral extension than the width of the locking groove so that the coupling bolt and especially the tapered web may only be released from the locking groove by a movement against the insertion direction. Due to this dimension ratios of holding head, tapered web and supporting section compared to the locking groove and the inserting section, a form-fit connection between coupling bolt and the holder results. This form-fit connection is releasable by the acting mechanical forces only if the material of the coupling bolt and/or the holder fails. Therefore, a specific material choice for the coupling bolt and the holder preferably ensures the desired stability of the coupling and thus the connection between the first and the second component. In this context, the coupling bolt consists preferably of metal while the holder is constructed also of metal or of a suitable plastic having an appropriate shore hardness and low elasticity. In the same way, also other materials or material combinations are usable as far as the desired stability is achieved.

According to a further preferred embodiment, the abutting portion of the holder is adapted to the shape of the supporting section of the coupling bolt so that the coupling bolt and the holder support each other at least partly in the locked condition. The abutting portion may have the shape of a ball socket, in the lateral surface of which the keyhole is formed.

If mechanical loads occur at the first and/or the second component, these are transferred between the two components by the coupling. As the supporting section of the coupling bolt at least partly abuts at the abutting portion of the holder, the transfer of mechanical loads, as for example component vibrations, occurs by means of the portion of the surfaces of abutting portion and supporting section which abut each other. For keeping the mechanical loads of the holder and the coupling bolt at that as low as possible, a large contact surface between abutting portion and supporting section is preferred. This is realized according to a preferred embodiment in that the abutting portion is formed complementary to the supporting section of the coupling bolt. A preferred embodiment of the supporting section uses a ball arranged between the fastening end and the holding head, which engages an abutting portion of the holder formed at least partly or completely as ball socket. It is also preferred to use other shapings for the supporting section and the abutting portion which are adapted to each other like, for example, a conical or a cylindrical shape of the supporting section and a correspondingly complementary thereto shaped abutting portion. It is further preferred to combine a conically shaped abutting portion with a ball-shaped supporting section.

According to a further preferred embodiment, the holder comprises laterally arranged fastening webs by means of which the holder is fastenable at the second component, preferably lockable or clampable. Alternatively, preferably lateral webs are arranged at the holder which are receivable in corresponding grooves at the second component. These webs are clamped, glued, or otherwise reliably fastened in these grooves.

Further preferred, the supporting section of the ball bolt is formed ball-shaped, as has already been discussed above. The holding head preferably forms a mushroom-shaped structure with the tapered web, which supports the locking of the coupling bolt in the locking groove.

According to a further preferred embodiment, the abutting portion of the coupling is formed having at least two stages with respect to a longitudinal axis of a coupling bolt being arrangeable in the keyhole in a locking manner so that the abutting portion between the holding head and the supporting section of the coupling bolt can be braced mechanically.

In the coupling bolt, the holding head and the supporting section connected thereto by means of a web form each an undercut in longitudinal direction of the coupling bolt so that the holder, especially the abutting portion, may be supported at the holding head and the supporting section in opposite directions. This makes it possible to realize a press-fit of the abutting portion between holding head and supporting section additionally to the form-fit connection in the abutting portion by means of the keyhole. For this purpose, preferably the abutting portion is formed with two stages. A first stage of the abutting portion ensures the abutting and supporting of the abutting portion at the supporting section of the coupling bolt. A second stage of the abutting portion adjoins the first stage of the abutting portion in axial direction of the lockingly arrangeable coupling bolt. Thus, preferably the first stage of the abutting portion is formed conically while the second stage of the abutting portion has a ball-shaped design. It is also preferred to form both stages of the abutting portion conically, ball-shaped or with another shape as long as the supporting at holding head and supporting section is ensured. These two preferred stages of the abutting portion are formed in their extension parallel to the longitudinal axis of the lockingly arrangeable coupling bolt such that they are arrangeable in a press-fit only by means of a compression occurring in a longitudinal direction of the coupling bolt between the holding head and the supporting section. Due to this press-fit, the abutting portion, which abuts the holding head, is pressed against the supporting section. A locking of the coupling bolt means in this context an arranging of the coupling bolt at the closed end of the locking groove.

According to a further preferred embodiment, the abutting portion of the coupling or the holder consists of at least a first and a second areal segment which each face the supporting section or in general the coupling bolt and which are arranged at least partly symmetrically around the lockingly arrangeable coupling bolt.

As already mentioned above, the areal segments are preferably formed differently. Their abutting surface faces, however, preferably the supporting section of the coupling bolt while a back or side surface of the first areal segment is supported at the holding head in the locked condition. This type of arrangement of the areal segments serves in the compressed condition of the abutting portion or after locking of the coupling bolt in the keyhole for an abutting of a surface of the areal segments of the coupling, which is as large as possible, at the supporting section. The areal segments, which are preferably adapted in their symmetry to the coupling bolt, ensure a certain flexibility upon inserting of the coupling bolt into the keyhole. In this way, no precise pre-orientation of the coupling bolt with respect to the areal segments is necessary.

According to a further preferred embodiment, the areal segments are formed ball-shaped. Further, preferably a radius of the first ball-shaped areal segment is smaller than the radius of a second ball-shaped areal segment. Furthermore, the first ball-shaped areal segment is preferably arranged adjacent to the keyhole.

The second ball-shaped areal segment is adapted preferably in its dimension to the supporting section of the coupling bolt. According to an embodiment, the second ball-shaped areal segment forms a ball-socket which is formed complementary to the ball-shaped formed supporting section. The first ball-shaped areal segment is arranged on the second ball-shaped areal segment hat-shaped or similar to a collar. Therefore, it protrudes radially outwardly from the circumferential area of the second ball-shaped areal segment and forms preferably a protrusion in which the keyhole is formed. The radial extension of the protrusion starting at the imagined inner abutting surface of the second areal segment being extended in circumferential direction is preferably larger than the length of the connecting web between the holding head and the supporting section. Thus, the coupling bolt is lockable in the keyhole only if the first and the second areal segment are compressed in the longitudinal direction of the coupling bolt to realize the press-fit of the abutting portion between holding head and supporting section of the coupling bolt.

According to a further preferred embodiment, the first areal segment is formed conically or ball-shaped and the second areal segment is formed conically or ball-shaped, wherein in case of two conical areal segments a cone angle of the first areal segment is smaller than the cone angle of the second areal segment. Analogously to the above-described ball-shaped formed areal segments, also cone-shaped areal segments or conically and ball-shaped formed areal segments are combinable with each other.

In this context, it has to be ensured that always the first areal segment, whether it is formed conically or ball-shaped, has to be adapted to the first areal segment in its dimension such that it is arranged on the second areal segment hat-like or collar-like. This shaping ensures that especially the first areal segment has to be compressed in axial direction of the coupling bolt for the press-fit of the abutting portion at the lockingly arranged coupling bolt to be able to arrange the first areal segment between holding head and supporting section of the coupling bolt. From this it follows that a radius of a ball-shaped first areal segment or a cone-angle of a conical first areal segment may not be larger than or equal to a radius of a ball-shaped second areal segment or a cone-angle of a conical second areal segment.

According to a further preferred embodiment, the first areal segment is formed ball-shaped with a diameter being smaller than the diameter of the supporting section, and the second areal segment is formed truncated cone-like so that the supporting section is engageable or abuttable tangentially by the second areal segment.

The present disclosure further comprises the coupling bolt for the above-mentioned coupling. The coupling bolt comprises the fastening end, the holding head and the supporting section arranged therebetween, in which the holding head and the supporting section are connected to each other by a web being tapered with respect to the holding head, and the fastening end is fastenable at a component. The supporting section may be formed ball-shaped and the holding head forms a mushroom-shaped structure with the tapered web. The advantages of the individual components as well as their interaction with the holder have already been described above. With respect to the fastening end, it preferably comprises a thread, a snap lock, a bayonet closure, or another structure for reliably fastening the coupling bolt at or in the component.

The present disclosure also comprises the already above-mentioned holder of the coupling. The holder comprises a keyhole and an abutting portion, in which an edge of the keyhole encloses a non-planar surface and the holder is fastenable at a component by means of a fastening structure. Also preferred, the holder comprises laterally arranged spring webs or fastening webs by means of which the holder is lockable, clampable or generally fastenable at a component. Preferably, these fastening webs engage in or at fastening grooves or other constructions which are adapted constructively thereto for reliably fastening the holder at the component. Further, the holder has the same constructive and functional features as discussed above in connection with the coupling. Accordingly, preferably the abutting portion is formed at least with two-stages in the direction of a longitudinal axis of the coupling bolt being lockingly arrangeable in the keyhole so that the abutting portion is mechanically braceable between the holding head and the supporting section of the coupling bolt. Further, the abutting portion consists of at least a first and a second areal segment which are arranged symmetrically around the coupling bolt which is lockingly arrangeable in the keyhole. According to a further embodiment of the holder, the first areal segment is formed conically or ball-shaped and the second areal segment is formed conically or ball-shaped, wherein in case of two conical areal segments a cone angle of the first areal segment is smaller than the cone angle of the second areal segment. A further embodiment of the holder comprises the first areal segment in a ball-shaped embodiment having a diameter which is smaller than a diameter of the supporting section of the coupling bolt and in which the second areal segment is formed truncated cone-like and engages or abuts tangentially at the supporting section.

The present disclosure also comprises a method for connecting a first and a second component by means of a coupling, preferably a form-fit acting coupling. According to an embodiment, such a coupling corresponds to the coupling which has been describe already above. For realizing the method, the first component is connected to a coupling bolt by means of a fastening end, wherein the coupling bolt comprises a holding head, a supporting section and a tapered web arranged therebetween. The second component comprises a holder having a keyhole and an abutting portion, wherein an edge of the keyhole encloses a non-planar surface. The method for connecting the first and the second component comprises the following steps: inserting the holding head into an inserting section of the keyhole so that the supporting section abuts the holder, and pivoting of the coupling bolt with respect to the holder so that the tapered web of the keyhole between the holding head and the supporting section is arranged at least partly in a form-fit manner or positively in a locking groove of the keyhole.

Due to the shaping of the coupling bolt and the holder and due to the connection of the coupling bolt with the first component and of the holder with the second component, a form-fit connection is present between the first and the second component. Such a form-fit connection resists high mechanical loads as generally the material condition of the coupling bolt and the holder define the strength of the connection.

It is further advantageous that the form-fit connection is creatable only by means of a specific combination of movements. Especially, the coupling bolt is locked in the keyhole of the holder by means of a linear inserting movement and a subsequent pivoting movement. If preferably the holder is connected to an engine cladding or a similar part, it can be plugged onto the coupling bolt in a spatially inclined orientation and it can then be locked at the coupling bolt by a subsequent pivoting movement. This makes it possible that such a cladding or another component is releasable from the coupling bolt only if the above-mentioned relative movements between coupling bolt and holder, i.e. the pivoting movement and the linear movement, are performed in reversed order. Thus, the connection is especially not releasable by a linear extracting of the coupling bolt from the holder. If the second component is fixed in this position after completion of the pivoting movement, for example in a second plug-in coupling or by means of a further connection element, the coupling guarantees a loadable and reliable fixing of the first and the second component at each other.

The connection method may comprise the further step: spring pre-tensioning the supporting section of the coupling bolt against the abutting portion of the holder by means of pivoting the tapering web into the locking groove. According to a further preferred embodiment of the method, the supporting section is formed ball-shaped. The supporting section is further received in the ball socket-like abutting portion which is preferably formed conically or ball-shaped so that forces between the coupling bolt and the holder are transferred areally.

Further, the above-discussed first and second areal segments are provided in the holder. Based on the two-stage shaping of the abutting portion, especially of the areal segments, a press-fit of the holder is created between the holding head and the supporting section of the coupling bolt.

It is further preferred to create a further connection between the first and the second component at the end of the pivoting movement, preferably by means of a plug-in coupling as it has been already explained above.

The present disclosure also comprises a first and a second component, which are connected to each other by at least one coupling according to the above-described embodiments. The first and the second component may be connected to each other by means of a plug-in coupling additionally.

As has been already explained above in the context of the preferred method steps of the method for connecting the first and the second component, the plug-in coupling creates a reliable/loadable connection between the first and the second component. The second plug-in coupling ensures, besides an additional mechanical hold of the two components at each other, a securing which prevents a releasing of the form-fit connection in the coupling.

5. SHORT DESCRIPTION OF THE ACCOMPANYING DRAWINGS

Figure 2:
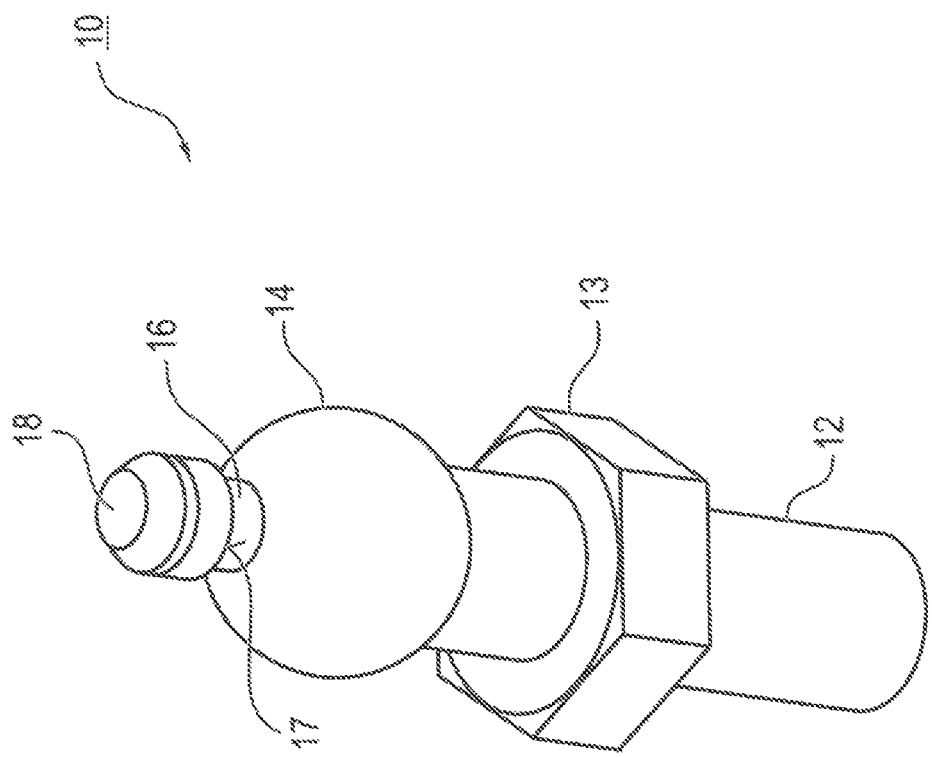
Figure 3:
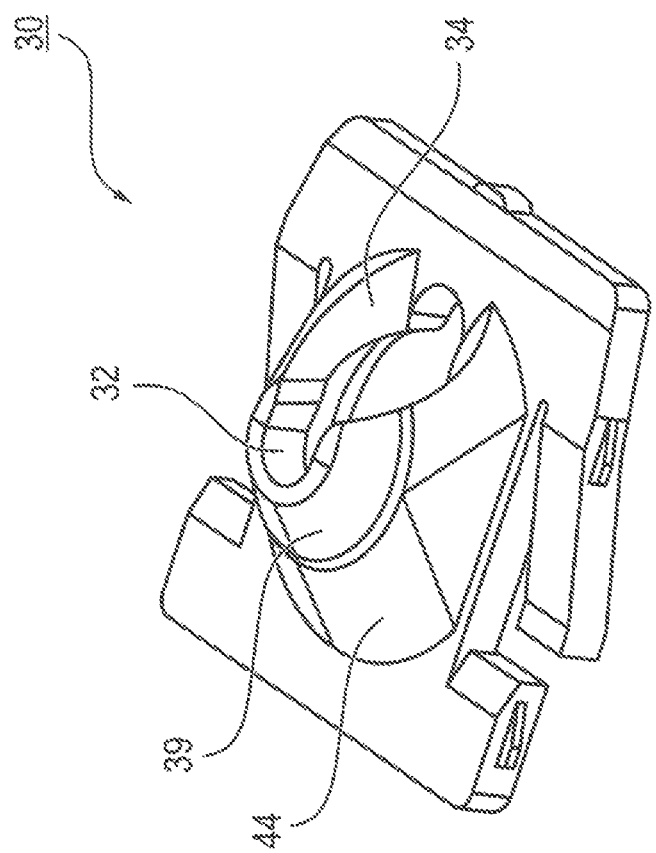
Figure 4:
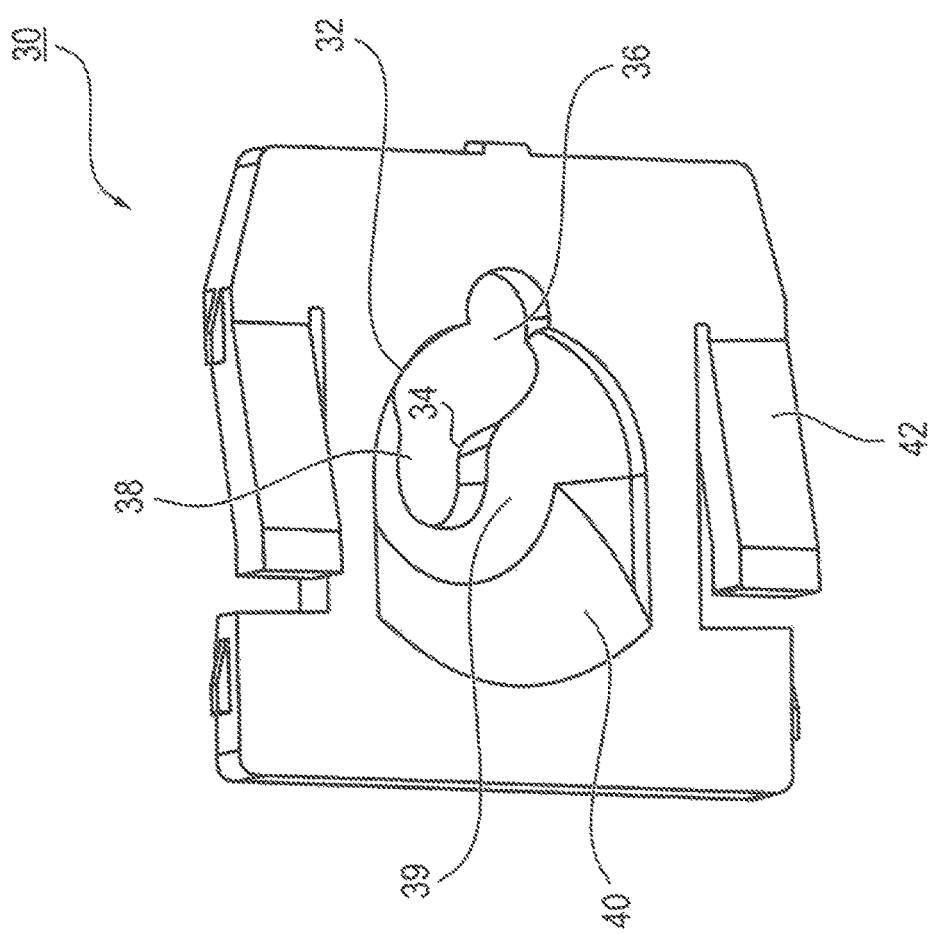
Figure 5A:
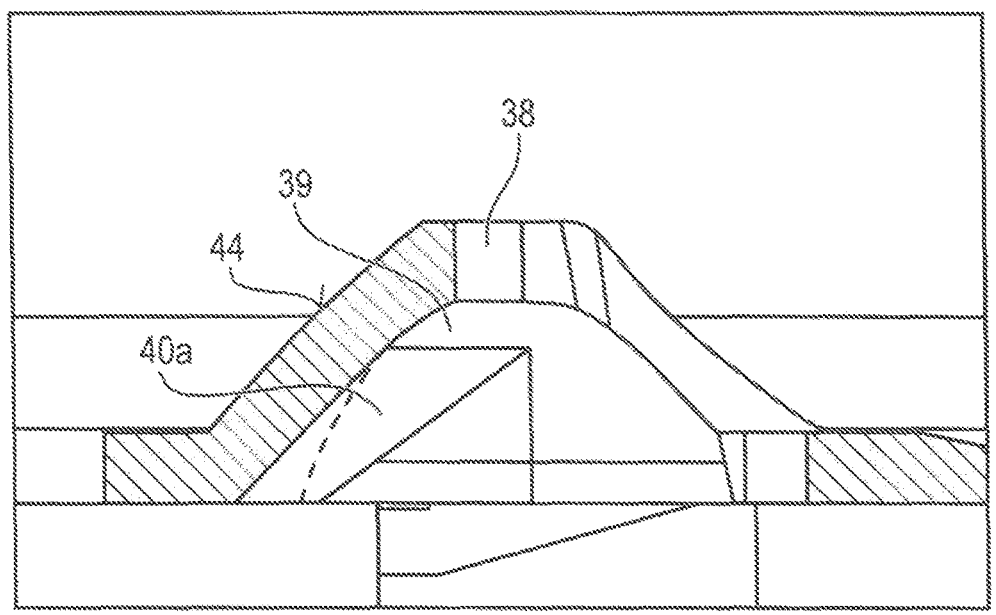
Figure 5B:
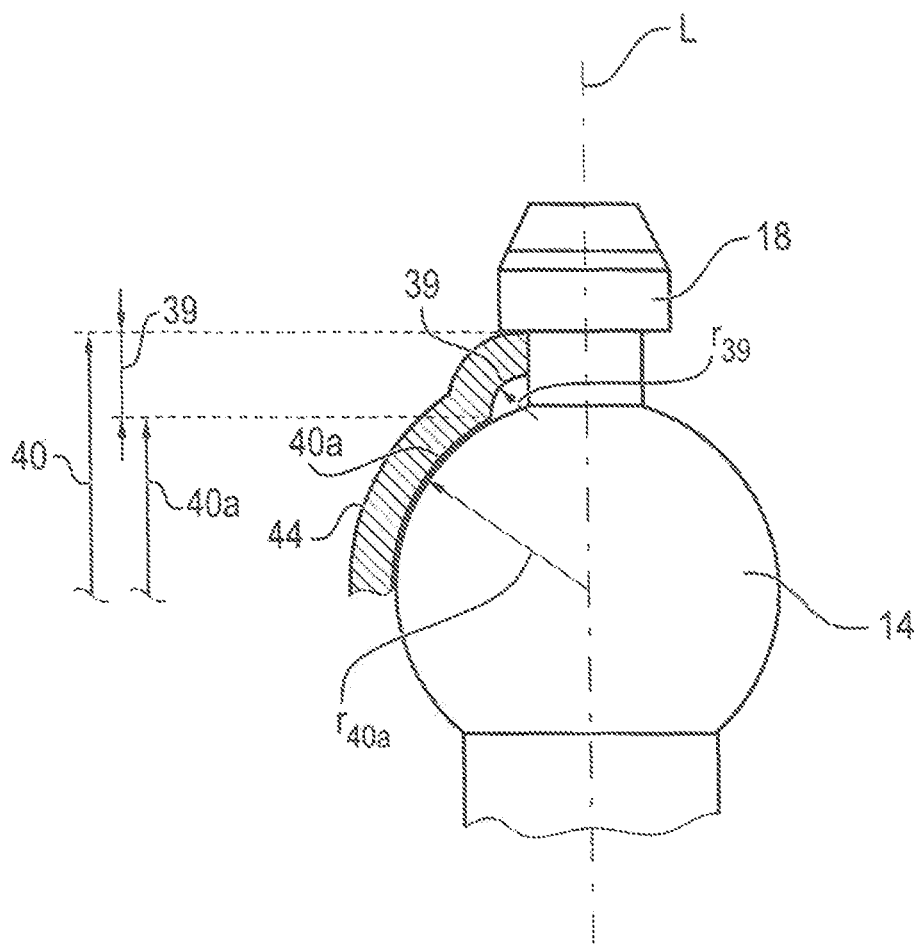
Figure 5C:
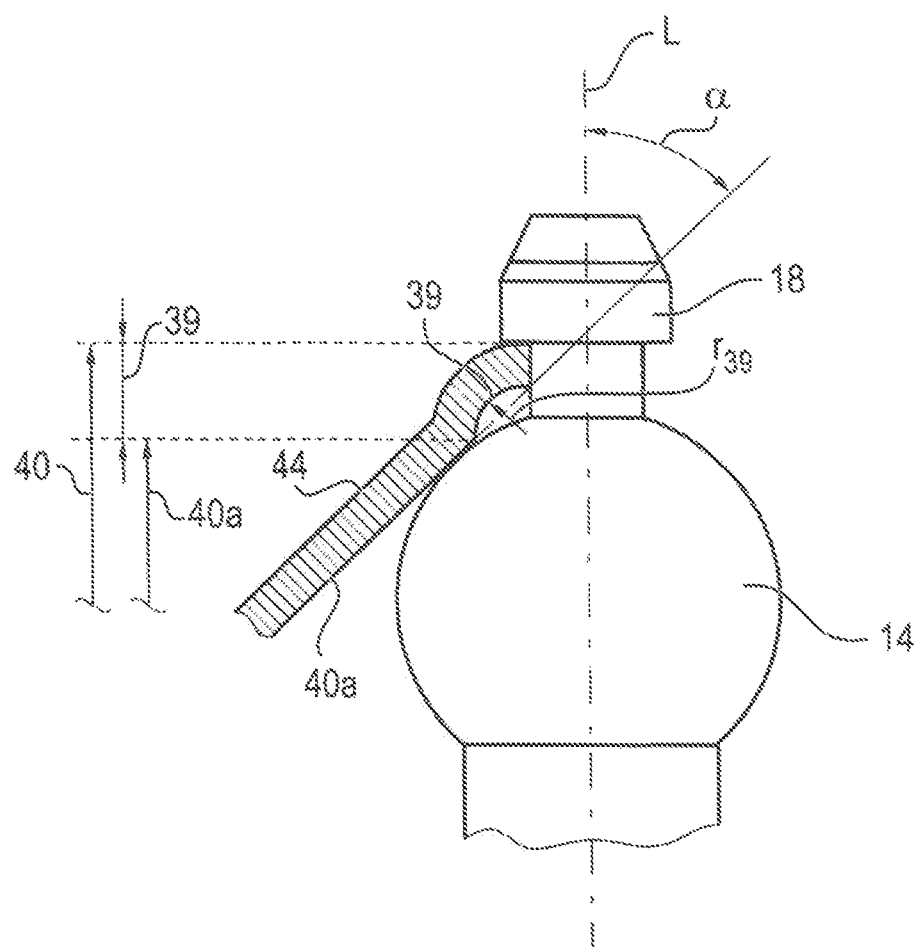
Figure 5D:
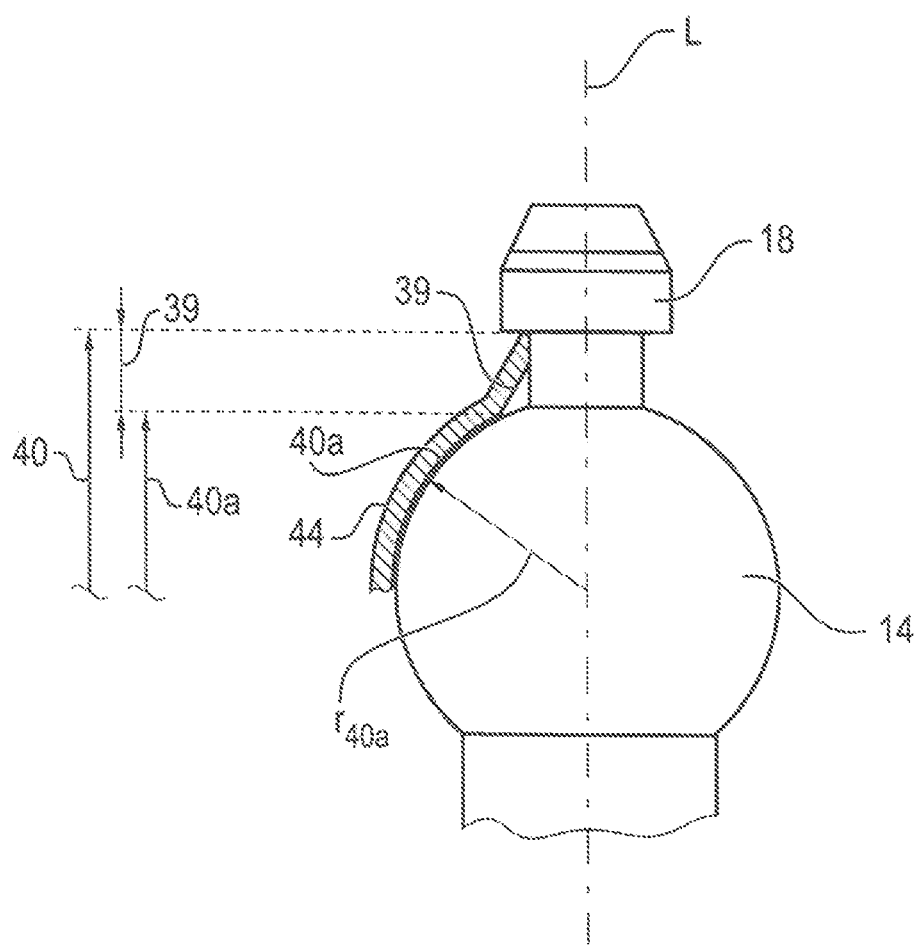
Figure 5E:
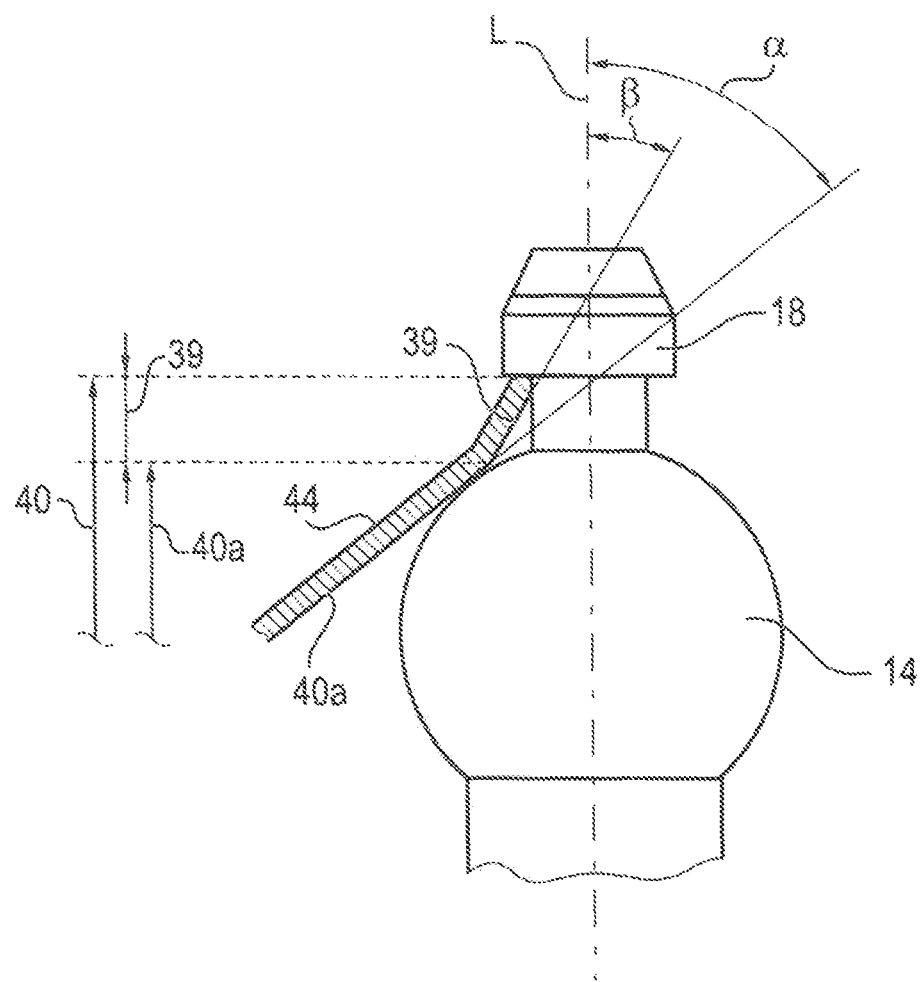
Figure 6:
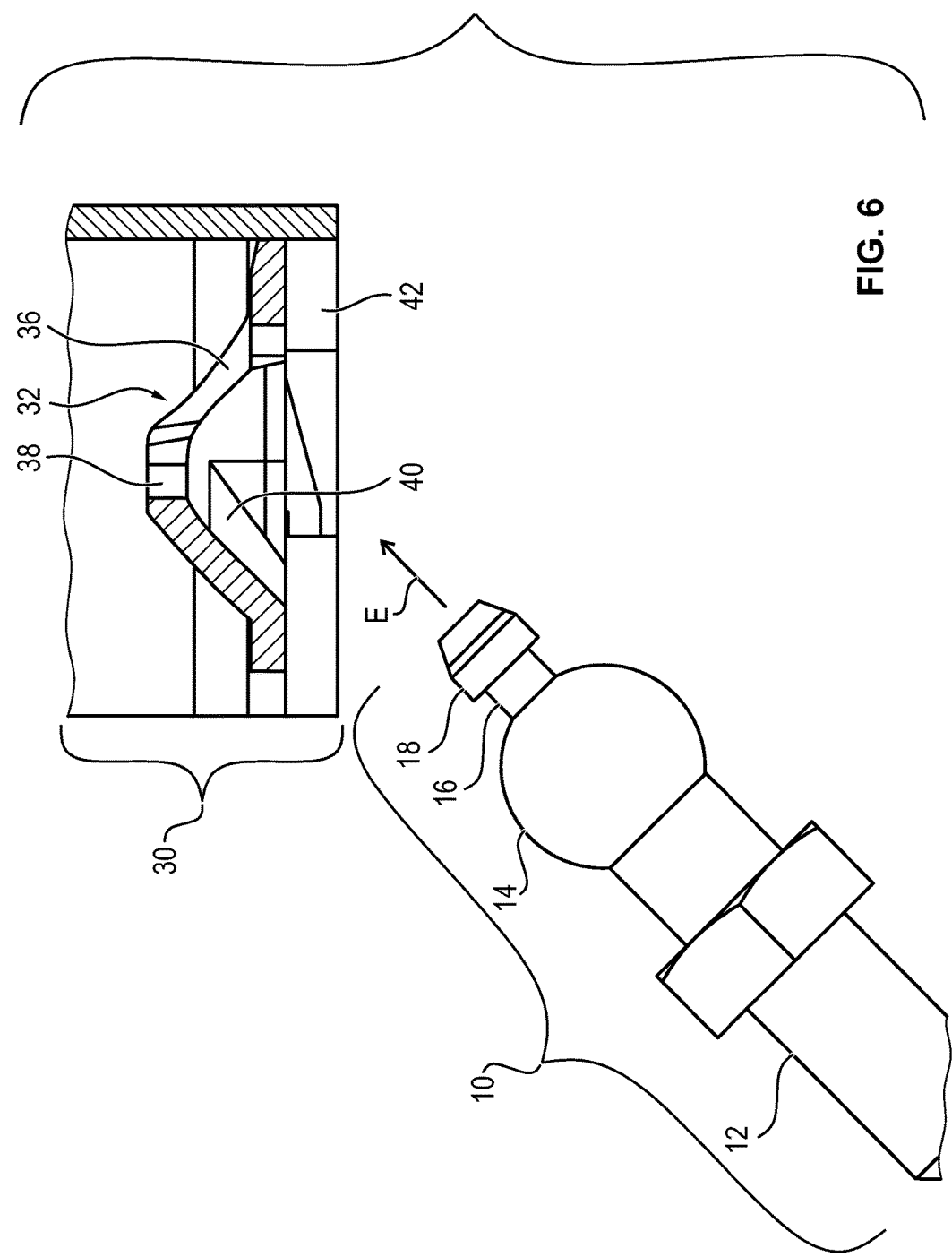
Figure 7:
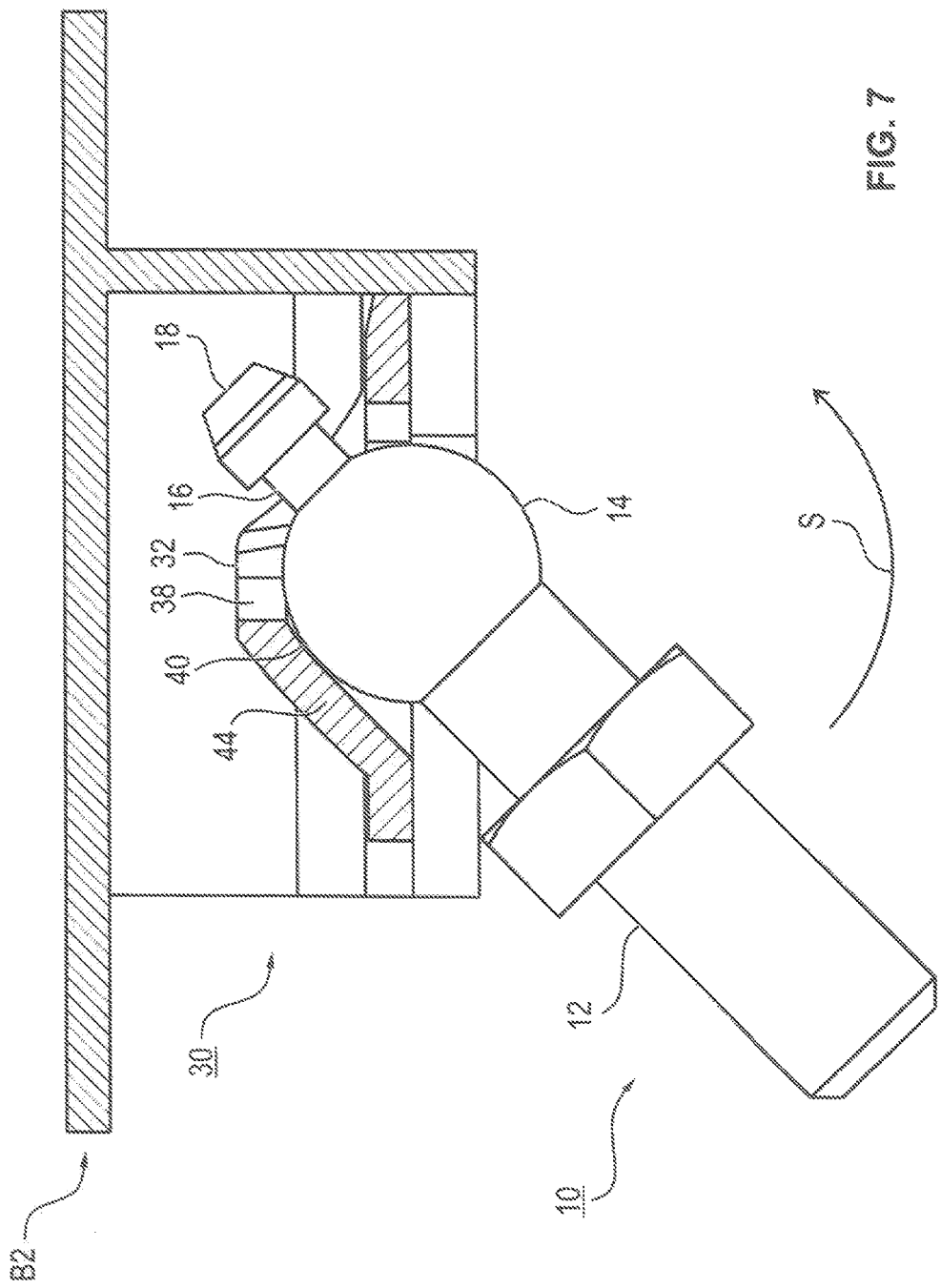
Figure 8:
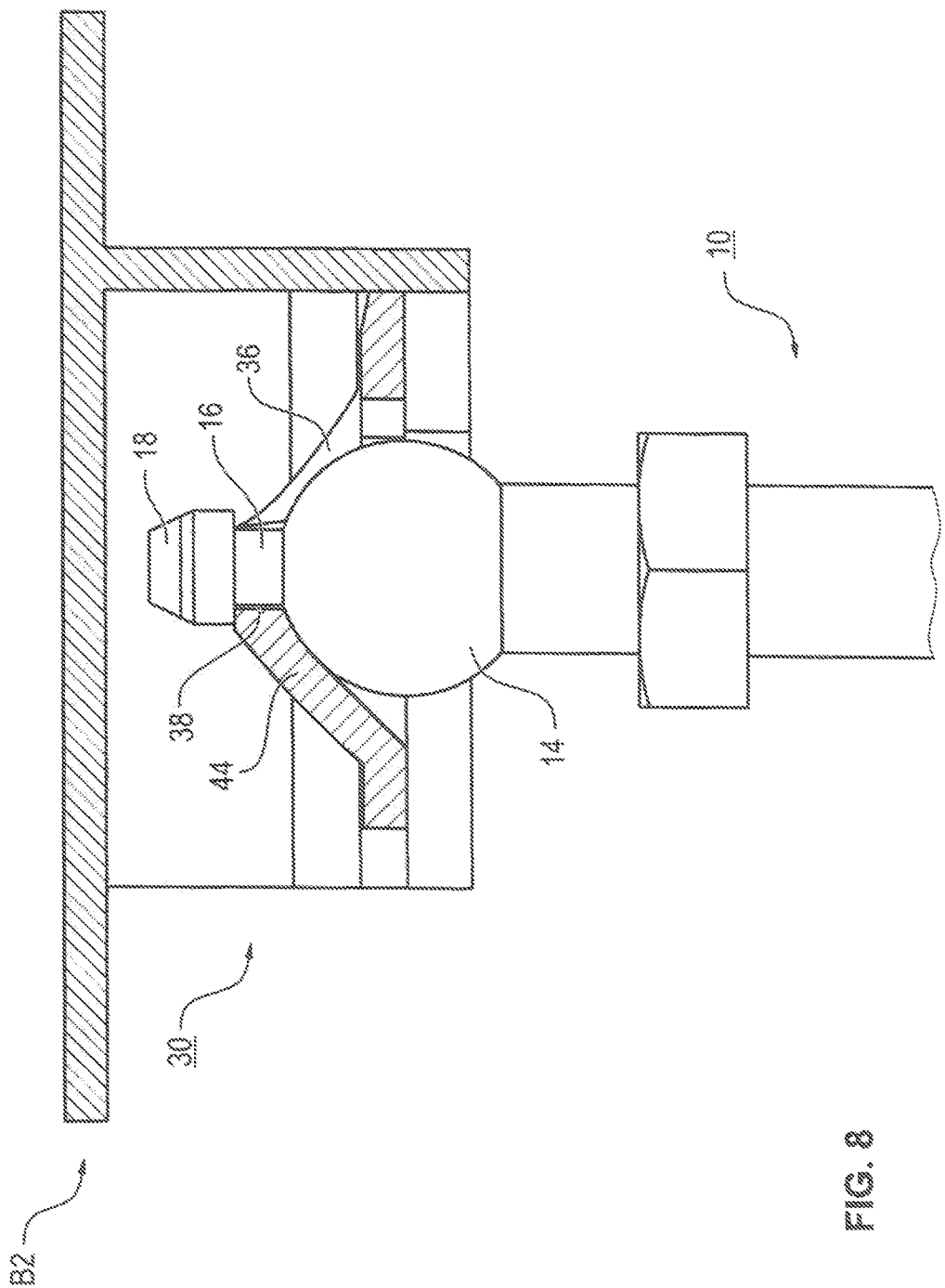
Figure 9:
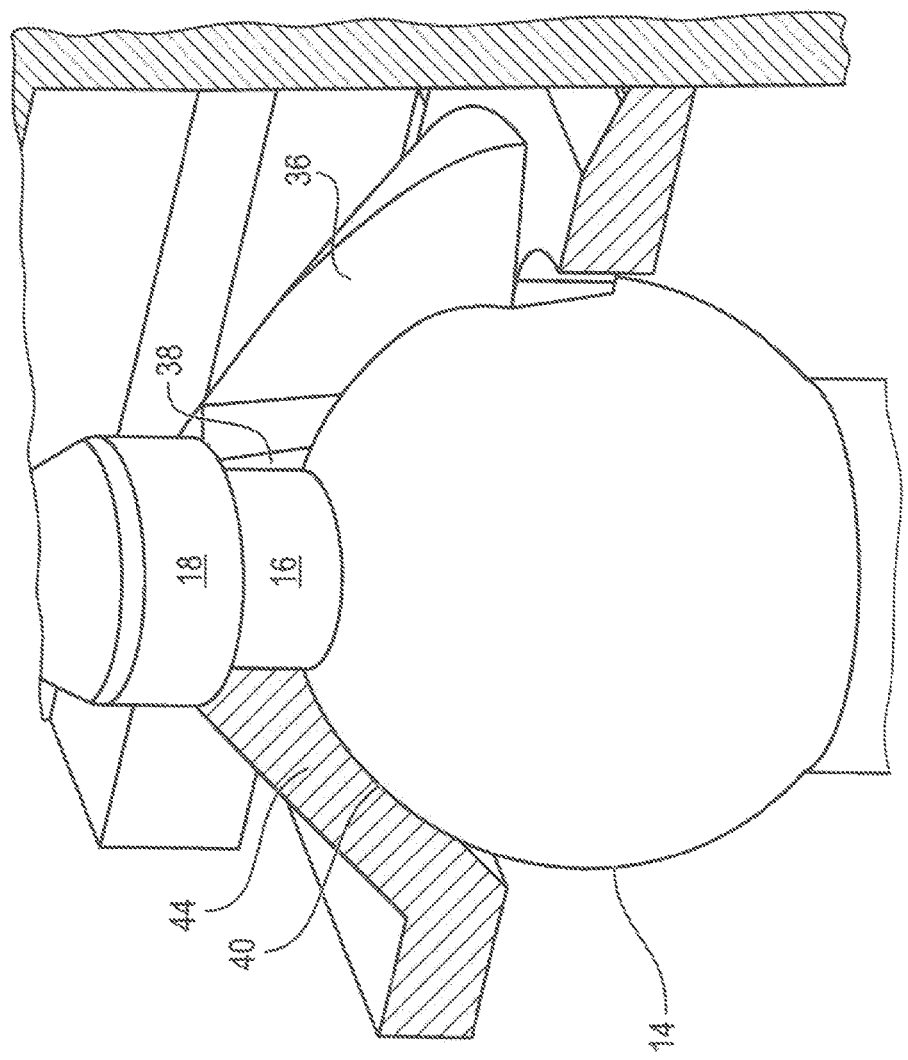
Figure 11B:
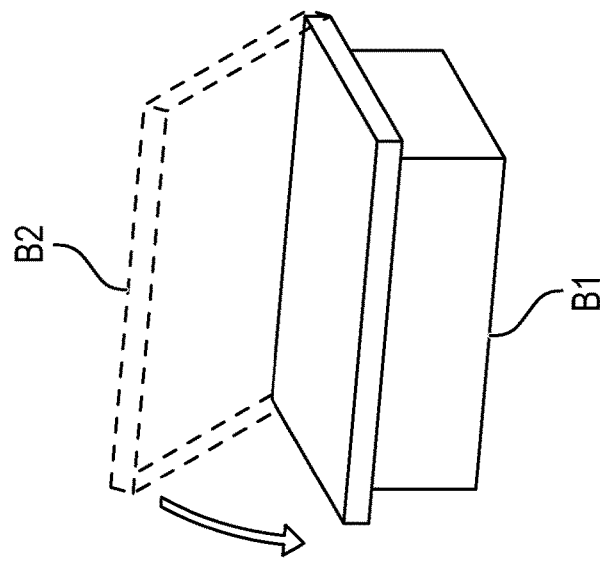
Figure 11A:
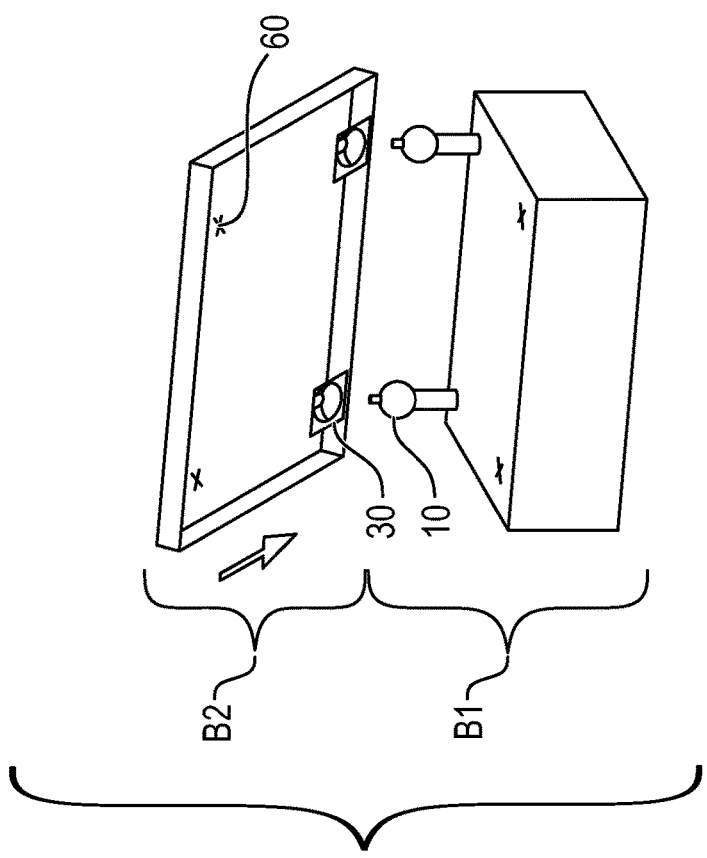

The preferred embodiments of the present disclosure are described in detail with respect to the accompanying drawings. It shows:

FIG. 1 a perspective view of a preferred embodiment of the coupling in conjunction with the second component, FIG. 2 a perspective view of the coupling bolt of FIG. 1, FIG. 3 a perspective view of the holder of FIG. 1, FIG. 4 a perspective view of the holder of FIG. 1 from the bottom, FIG. 5a-e preferred configurations of the holder in a partial sectional schematic depiction with and without coupling bolt, FIG. 6 a side view of the preferred coupling bolt and the preferred holder prior to the inserting of the coupling bolt into the holder, FIG. 7 a partial sectional side view of the preferred coupling bolt and the preferred holder after the coupling bolt has been inserted into the receiving portion of the holder, FIG. 8 a partial sectional side view of the preferred coupling bolt and the preferred holder after the coupling bolt has been locked in the locking groove, FIG. 9 an enlarged partial sectional view of the connection between coupling bolt and holder of FIG. 7, FIG. 10 a perspective view of the preferred embodiment of the coupling consisting of coupling bolt and holder, FIGS. 11a-b a schematic depiction of the usage of the coupling in combination with a first and a second component, and FIGS. 12a-e a flow chart of a preferred embodiment of the connection method of the first and second component by means of the coupling (FIG. 12a) and a sequential depiction of the connection method by means of the preferred coupling bolt and the preferred holder in combination with the second component (FIGS. 12b-e).

6. DETAILED DESCRIPTION

The coupling serves for fastening a first component B1 and a second component B2 at each other. In the broadest sense, it is a matter of a plug-in coupling. While common plug-in couplings mainly realize a press-fit—thus, a force-fit connection—the present coupling uses a form-fit connection for providing a reliable connection between the components B1, B2. According to preferred embodiments, the realized form-fit is supported by an additional force-fit connection.

A perspective view of a preferred embodiment of the coupling is shown in FIGS. 1 and 9. The individual components of the coupling and their preferred embodiment are shown in FIGS. 2 to 8.

The coupling serves for the preferred form-fit connection between the first component B1 and the second component B2. For creating the connection, a coupling bolt 10 is fastened with its fastening end 12 in the first component B1. A holder 30, with which the coupling bolt 10 will be connected, is fastened at the second component B2. To this end, a lateral fastening structure is provided preferably at the holder 30.

In a preferred application, the first component B1 represents an engine block or a supporting structure in a vehicle. The second component B2 is formed by a cover as, for example, an engine cover or the like. By the coupling, the cover B2 is fastenable at the supporting structure or the engine block B1 by means of an inserting-pivoting-movement, as schematically shown in FIG. 11. For this purpose, FIG. 11a shows a preferred inserting of the coupling bolt 10 into the holder 30, in which the first B1 and the second component B2 or the coupling bolt 10 and the holder 30 are moved relatively towards each other. This preferred inserting of the coupling bolt 10 into the holder 30, which is also denoted as linear relative movement, leads to a preparation of a connection between the two components B1, B2.

After the coupling bolt 10 has been inserted into the holder 30, the holder 30 is pivoted relative to the coupling bolt 10 or the second component B2 is pivoted relative to the first component B1 (see FIG. 11b). Based on this inserting-pivoting-movement between the holder 30 and the coupling bolt 10, a form-fit connection is created which can be released without destruction only by the reversal of the pivoting movement and the linear relative movement or inserting movement. As long as this reversal of the inserting-pivoting-movement, which releases the connection, is avoided, a failure-stable connection is present between the first B1 and the second component B2.

For avoiding the reversal of the pivoting movement after creation of the connection between the first B1 and the second component B2, preferably a plug-in coupling is provided between component B1 and component B2. Such plug-in couplings or other connections are known in the prior art. If preferably a ball bolt or ball pin with plug-in coupling is used, it is preferred to arrange them opposite to each other in a portion of the components B1, B2 which is spaced from the coupling. Preferred positions are schematically indicated by crosses in FIG. 11a. As soon as the additional connection, preferably by means of additional plug-in couplings, is created between the components B1, B2, a releasing pivoting movement in opposite direction as shown in FIG. 11b is prevented thereby.

The stability and mechanical loadability of the coupling is, beside others, determined by the material characteristics of the coupling bolt 10 and the holder 30. Therefore, the coupling bolt 10 consists preferably of metal or ceramic or a stable plastic with or without fiber-reinforcing or of a combination of these materials. The holder 30 preferably consists of a stable, preferred resilient, plastic with or without fiber-reinforcing or of a metal or of a combination thereof.

A preferred embodiment of the coupling bolt 10 is shown in FIG. 2. The coupling bolt 10 is connected to the first component B1 by means of the fastening end 12. For this purpose, the fastening end 12 comprises a thread, a snap-in locking connection, a gluing dome or another known construction for a reliable attaching to the first component B1. According to FIG. 2, the fastening end 12 comprises preferably an outer thread, which is screwed into a component opening (not shown) by means of a hexagon profile 13.

Further, the longitudinal construction of the coupling bolt 10 comprises a supporting section 14. After the connection to the holder 30 has been created, the holder 30 and the coupling bolt 10 support each other by means of the supporting section. By means of the supporting section, mechanical loads are transferred between the components B1, B2. The holder 30, which is adapted to the supporting section 14 in its shape, comprises for this purpose preferably an abutting portion 40 formed at a lateral surface 44 of the holder 30 facing the coupling bolt. The term lateral surface 44 follows from the shaping of the abutting portion 40 as this lateral surface 44 at least partly encloses the supporting section 14.

According to the shown preferred embodiment in FIG. 2, the supporting section 14 is formed ball-shaped. The abutting portion 40 adapted thereto is formed similar to a ball-socket or calotte, and thus almost complementary to the ball-shaped supporting section 14. It is also preferred to form the supporting section 14 cylindrically, conically, elliptically or curved. In doing so, preferably the surface of the supporting section 14 facing the abutting portion 40 is formed continuously to ensure a sliding and/or supporting of the abutting portion 40 on the supporting section 14. Therefore, it is for example preferred that, in case the supporting section 14 is formed cylindrically, a longitudinal axis of the cylinder is arranged transversely to the longitudinal axis of the coupling bolt 10.

A web 16 adjoins the supporting section 14. The web 16 connects the supporting section 14 and a holding head 18. The web 16 preferably has a round outer contour, although it may also be formed angularly. Compared to the supporting section 14 and to the holding core 18, the web 16 is formed thinner, thus tapered, measured transversely to the longitudinal axis of the coupling bolt 10. Thus, the holding head and the supporting section 14 protrude in radial or lateral direction beyond the cross-section of the web 16.

In its thickness or its cross-section, the web 16 is adapted to a keyhole 32 in the lateral surface 44 of the holder 30. The key hole 32 consists of an inserting section 36 having a greater or wider diameter compared to the holding head 18 and transitioning into a locking groove 38. The locking groove 38 is only slightly wider than the web 16 so that the web 16 can be received in the locking groove 38. The web 16 is held in a form-fit manner in the locking groove 38. The holding head 18 and the supporting section 14 extend in radial or lateral direction beyond the width of the locking groove 38. Therefore, the web 16 is not releasable from the locking groove 38 in axial direction of the coupling bolt 10.

Further preferred, the web 16 has an axial length which is defined by the adjacent holding head 18 and the adjacent supporting section 14. Preferably, the length of the web 16 corresponds to the thickness of the lateral surface 44 at the closed end of the locking groove 38.

The defined length of the web 16 serves for a locking of the coupling bolt 10 in the keyhole 32. As soon as the coupling bolt 10 has been pivoted relatively to the holder 30, the web 16 is or will be arranged at the closed end of the locking groove 38. Depending on the length of the locking groove 38, the web 16 is already arranged at the end of the locking groove 38 after the pivoting. It is also preferred that, if the locking groove 38 is elongated, a linear displacing of the web 16 towards the end of the locking groove 38 has to occur after the pivoting. In this position, preferably the lateral surface 44 is held between a bottom side 17 of the holding head 18 facing the supporting section 14 and the supporting section 14. Depending on the thickness and/or the shaping of the lateral surface 44, the lateral surface 44 is preferably clamped in this position. Thus, the supporting section 14 and the bottom side 17 each form an undercut against a releasing of the web 16 from the locking groove 38 in axial direction.

In FIGS. 3 and 4, the lateral surface 44 which is adapted in its shape to the supporting section 14 is preferably shown. The side of the lateral surface 44 facing the supporting section 14 forms the abutting portion 40. One can see that the keyhole 32 consisting of inserting section 36 and locking groove 38 is cut out of the lateral surface 44. As the lateral surface 44 does not extend in one plane, the edge 34 of the keyhole 32 encloses a non-planar surface. Correspondingly, the keyhole 32 extends also or lies preferably not in one plane. From this it follows that an inserting and locking of the coupling bolt 10 in the keyhole 32 is not realizable solely upon a linear movement. To the contrary, it is necessary that the coupling bolt 10 is pivoted relative to the keyhole 32 after a linear inserting or plugging into the inserting section 36. Therefore, the holding head 18 and the web 16 preferably move on an imagined circular arc-like segment for getting arranged, preferably locked, at the closed end of the locking groove 38.

The lateral surface 44 of the holder 30 and especially the radially inner lying or radially inwardly oriented abutting surface 40 are preferably formed two-staged. This ensures the clamping or a press-fit of the holder 30 between the holding head 18 and the supporting section 14.

To this end, the abutting surface 40 lying radially inwardly has two different portions in its shaping. With respect to a longitudinal axis of the coupling bolt 10, which is arrangeable in the locking groove 38, the two different portions are arranged axially in succession in form of a first 39 and a second areal segment 40a. Therefrom, a two-stageness of the abutting surface 40 results, as it does not extend continuously.

According to different embodiments of the holder 30, which are shown in FIGS. 5a-e, the first and the second areal segment 39, 40a lying radially inwardly are formed equally or differently with respect to their shape. According to different embodiments, the first 39 and the second areal segment 40a are formed ball-shaped and ball-shaped (see FIGS. 5a, b), ball-shaped and conically (see FIG. 5c), conically and ball-shaped (see FIG. 5d) or conically and conically (see FIG. 5e). It has to be understood that further graduations or stepped constructions may be arranged in the areal segments 39, 40a. It is further preferred to provide the supporting section 14 as a polyhedron, a cylindrical roll transverse to the longitudinal axis L of the coupling bolt 10 or in another shaping.

As can be seen based on the schematically depicted preferred embodiments in FIGS. 5a-e, the portion having the first areal segment 39 forms a hat-like protrusion with respect to the second areal segment 40a or its lateral surface 44. This hat-like protrusion protrudes in radial direction beyond the outer diameter of the lateral surface 44. The radial extension of the protrusion with the radially inwardly arranged first areal segment 39 is larger than the length of the web 16. As the locking groove 38 preferably ends in the protrusion, the holder 30 is lockable in the portion of the protrusion between holding head 18 and supporting section 14 only by means of a press-fit. In this press-fit, the protrusion including the radially inwardly oriented first areal segment 39 is compressed in longitudinal direction L of the coupling bolt 10. Thereby, the protrusion is resiliently clamped between the undercut of the holding head 18 and the supporting section 14.

For realizing this press-fit, which supports a reliable support of the coupling bolt 10 in the holder 30, the areal segments 39, 40a are configurable differently or similarly. According to an embodiment, which is shown in FIG. 5b, the first 39 and the second areal segment 40a are formed ball-shaped. For realizing the protrusion and the press-fit, the inner radius $r_{39}$ of the first areal segment 39 is smaller than an inner radius $r_{40a}$ of the second areal segment 40a. Preferably, the supporting section 14 of the coupling bolt 10 is formed as ball. Further preferred, the second areal segment 40a has the same or a similar radius $r_{40a}$ as the supporting section 14.

According to the preferred embodiment of FIG. 5c, the second areal segment 40a is formed conically. The first areal segment 39 is formed ball-shaped. A cone angle $2\alpha$ and the inner radius $r_{39}$ are configured such that the first areal segment 39 forms the radial protrusion in the direction of the longitudinal axis L of the lockingly arrangeable coupling bolt 10. While the conically areal segment 40a is supported at the supporting section 14, the protrusion or the first areal segment 39 is forced under the undercut of the holding head 18. Thereby, the above discussed press-fit is ensured.

According to the preferred embodiment shown in FIG. 5d, the first areal segment 39 is formed conically. It also forms a radial protrusion protruding from the lateral surface 44. For this purpose, the cone angle of the protrusion or the first areal segment 39 is configured such that the protrusion protrudes radially from the lateral surface 44 shaped or qualified by the inner radius $r_{40a}$ of the second areal segment. Accordingly, the second areal segment 40a is formed ball-shaped with the inner radius $r_{40a}$. Preferably, the inner radius $r_{40a}$ corresponds to the radius of the ball-shaped supporting section 14.

A further preferred embodiment is shown in FIG. 5e. Here, the first 39 and the second areal segment 40a are formed conically. For realizing the protrusion by the first areal segment 39, a cone angle $2\beta$ of the first areal segment 39 is smaller than the cone angle $2\alpha$ of the second areal segment 40a. As a result, the protrusion protrudes in radial direction with respect to the supporting section 14 such that a press-fit of the holder 30 between the holding head 18 and the supporting section 14 is ensured.

Especially, the radially inner lying abutting portion 40 is formed non-complementary to the supporting section 14. In the preferred embodiment, the abutting portion 40 is thus especially not formed like a ball socket complementary to the supporting section 14 but it is divided at least two-staged in a first ball areal segment 39 and a second ball areal segment 40a. It has to be understood that more than two ball areal segments may be provided in the abutting portion 40. Further, it is preferred to form the abutting portion 40 not ball-shaped.

By means of the above-described preferred embodiments, the lateral surface 44 has a radial extension of the protrusion extending beyond a supporting surface in the portion of the closed end of the locking groove 38. At the same time, the abutting portion 40 is supported, however, at the supporting section 14. As soon as the bottom side 17 of the holding head 18 is supported at the edge of the locking groove 38 in axial direction, the portion 39 and thus preferably the lateral surface 44 is braced or resiliently clamped between the bottom side 17 of the holding head 18 and the supporting section 14. This supports the locking of the coupling bolt 10 in the holder 30 (see also FIG. 9).

The holder 30 furthermore comprises preferably a fastening structure at two side surfaces which are arranged oppositely to each other. The fastening structure serves for the clampingly, adhesively, lockingly or otherwise suitably fastening of the holder 30 at the second component B2. According to FIG. 10, preferably fastening webs 42 are provided engaging a groove (see FIGS. 6 to 8) adapted thereto. In this groove, the fastening webs 42 are braced, locked, glued or the like.

A preferred embodiment of the connection method is shown in summary in FIG. 12. The individual sequences of FIGS. 12b-e are shown enlarged in FIGS. 6 to 8.

For creating a connection between the first component B1 with coupling bolt 10 and the second component B2 with holder 30, first of all, the coupling bolt 10 is inserted in the inserting section 36 of the key hole 32 by means of a linear movement in axial direction of the coupling bolt 10 (see arrow E in FIG. 6, step S1). Preferably, the coupling bolt 10 is inserted so far until the supporting section 14 abuts the holder 30 and the holding head 18 extends beyond the holder 30 (see FIGS. 6 and 7). Accordingly, the inserting section 36 has a larger lateral or radial extension than the cross-section of the holding head 18.

The inserting is a relative movement between the coupling bolt 10 and the holder 30. Therefore, the coupling bolt 10 or the holder 30 may move while the other part stays, or the coupling bolt 10 and the holder 30 move at the same time. While FIG. 6 shows preferably the movement of the coupling bolt 10 into the keyhole 32, in FIGS. 12b-e the second component B2 with holder 30 is positioned on the coupling bolt 10.

Subsequently, preferably the coupling bolt 10 is pivoted (step S2) such that the holding head 18 is arranged at the closed end of the locking groove 38. Preferably, the pivoting S takes place around the supporting section 14 as pivoting point, according to FIG. 7 and according to FIGS. 12c and d. Because preferably the supporting section 14 is formed as a ball, which supports the pivoting movement. During the pivoting movement, preferably the holder 30 is transferred into a press-fit between the holding head 18 and the supporting section 14. The press-fit occurs in general by the compression of the protrusion in the first areal segment 39 while the second areal segment 40 is completely or partly supported at the supporting section 14.

During the completion or after finishing of the pivoting movement of the first B1 and the second component B2 relative to each other, preferably the first and the second component B1, B2 will be additionally connected to each other. This/these connection/connections is/are connected to each other according to different preferred embodiments by means of at least a plug-in coupling 60 (see FIG. 11), a threading, a locking mechanism, a snap-in locking mechanism or any other releasable connection (step S3).

Prior to the above method steps, the fastening of the coupling bolt 10 and the holder 30 at the components B1, B2 takes place (step S0).

7. LIST OF SOME CURRENTLY PREFERRED EMBODIMENTS

1. Coupling by means of which a first (B1) and a second component (B2) are connectable to each other, comprising the following features:
   a. a coupling bolt (10) comprising a fastening end (12), a holding head (18) and a supporting section (14) arranged therebetween, in which the holding head (18) and the supporting section (14) are connected to each other by means of a web (16), which is tapered with respect to the holding head (18), and the fastening end (12) is fastenable at the first component (B1),
   b. a holder (30) having a keyhole (32) and an abutting portion (40), in which an edge (34) of the keyhole (32) encloses a non-planar surface, the coupling bolt (10) is lockable in a form-fit manner in the keyhole (32) by means of an inserting-pivoting-movement and the holder (30) is fastenable at the second component (B2) by means of a fastening structure.
2. Coupling according to embodiment 1, in which the keyhole (32) comprises an inserting section (36) and a locking groove (38), in which the inserting section (36) forms a through-passage portion for the holding head (18) of the coupling bolt (10) and a width of the locking groove (38) is smaller than a diameter of the holding head (18) and larger than a thickness of the tapered web (16).
3. Coupling according to embodiment 1 or 2, in which the abutting portion (40) of the holder (30) is adapted to the shape of the supporting section (14) of the coupling bolt (10) so that the coupling bolt (10) and the holder (30) support each other at least partly in the locked condition.
4. Coupling according to embodiment 3, in which the abutting portion (40) has the shape of a ball socket, in the lateral surface of which the keyhole (32) is formed.
5. Coupling according to one of the preceding embodiments, in which the holder (30) comprises laterally arranged fastening webs (42) by means of which the holder (30) is fastenable, preferably lockable or clampable, at the second component (B2).
6. Coupling according to one of the preceding embodiments, in which the supporting section (14) of the ball bolt (10) is formed ball-shaped and the holding head (18) forms a mushroom-shaped structure with the tapering web (16).
7. Coupling according to one of the preceding embodiments, in which the abutting portion (40) is formed at least two-staged with respect to a longitudinal axis of a coupling bolt (10), which can be arranged in the keyhole (32) in a locked manner, so that the abutting portion (40) between the holding head (18) and the supporting section (14) of the coupling bolt (10) is mechanically braceable.
8. Coupling according to embodiment 7, in which the abutting portion (40) consists of at least a second and a first areal segment (40, 39), which each face the supporting section (14) and which are arranged at least partly symmetrically around the lockingly arrangeable coupling bolt (10).
9. Coupling according to embodiment 7 or 8, in which the areal segments (39, 40) are formed ball-shaped and a radius of the first ball-shaped areal segment (39) is smaller than a radius of the second ball-shaped areal segment (40) and in which the first ball-shaped areal segment (39) is arranged adjacent to the keyhole (32).
10. Coupling according to embodiment 7 or 8, in which the first areal segment (39) is formed conically or ball-shaped and the second areal segment (40a) is formed conically or ball-shaped, wherein in the case of two conical areal segments, a cone angle of the first areal segment is smaller than a cone angle of the second areal segment (40a).
11. Coupling according to embodiment 7 or 8, in which the first areal segment (39) is formed ball-shaped having a diameter which is smaller than a diameter of the supporting section (14), and in which the second areal segment (40a) is formed truncated cone-like so that the supporting section (14) is tangentially engageable by the second areal segment (40a).
12. Coupling bolt (10) for a coupling, comprising a fastening end (12), a holding head (18) and a supporting section (14) arranged therebetween, in which the holding head (18) and the supporting section (14) are connected to each other by means of a web (16) which is tapered with respect to the holding head (18), and the fastening end (12) is fastenable at a component (B1).
13. Coupling bolt (10) according to embodiment 11, the supporting section (14) of which is formed ball-shaped and the holding head (18) of which forms a mushroom-shaped structure with the tapered web (16).
14. Holder (30) of a coupling, comprising a keyhole (32) and an abutting portion (40) in which an edge (34) of the keyhole (32) encloses a non-planar surface and the holder (30) is fastenable at a component (B2) by means of a fastening structure (42).

15. Holder (30) according to embodiment 14 comprising laterally arranged spring-webs (42) by means of which the holder (30) is fastenable, preferably lockable or clampable, at the component (B2).

16. Holder (30) according to embodiment 14 or 15, the abutting portion (40) of which is formed with at least two stages in the direction of a longitudinal axis of a coupling bolt (10), which is arrangeable lockingly in the keyhole, so that the abutting portion (40) is mechanically braceable between the holding head (18) and a supporting section (14) of the coupling bolt (10).

17. Holder (30) according to embodiment 16, in which the abutting portion (40) consists of at least a first (39) and a second areal segment (40), which are arranged symmetrically around the coupling bolt (10), which can be arranged lockingly in the keyhole.

18. Holder (30) according to embodiment 15 or 16, in which the areal segments (39, 40a) are formed ball-shaped and a radius of the first areal segment (39) is smaller than a radius of the second areal segment (40a) and in which the first areal segment (39) is arranged adjacent to the keyhole (32).

19. Holder (30) according to embodiment 17, in which the first areal segment (39) is formed conically or ball-shaped and the second areal segment (40a) is formed conically or ball-shaped, wherein in case of two conical areal segments (39, 40a) a cone angle of the first areal segment (39) is smaller than a cone angle of the second areal segment (40a).

20. Holder (30) according to embodiment 17 or 19, in which the first areal segment (39) is formed ball-shaped having a diameter which is smaller than a diameter of the supporting section (14) and in which the second areal segment (40a) is formed truncated cone-like and engages tangentially at the supporting section (14).

21. Method for connecting a first (B1) and a second component (B2) by means of a, especially form-fit working, coupling, preferably a coupling according to one of the embodiments 1 to 11, in which
    the first component (B1) is connected to a coupling bolt (10) by means of a fastening end (12), the coupling bolt (10) having a holding head (18), a supporting section (14) and a tapered web (16) arranged therebetween, and the second component (B2) comprises a holder (30) having a keyhole (32) and an abutting portion (40), in which an edge (34) of the keyhole (32) encloses a non-planar surface, wherein the method comprises the following steps:
    a. inserting (S1) the holding head (18) into an inserting section (36) of the keyhole (32) so that the supporting section (14) abuts the holder (30), and
    b. pivoting (S2) the coupling bolt (10) relative to the holder (30) so that the tapered web (16) between the holding head (18) and the supporting section (14) is arranged at least in a form-fit manner in a locking groove (38) of the keyhole (32).

22. Method according to embodiment 21, having the further step:
    spring pre-tensioning (S3) the supporting section (14) of the coupling bolt (10) against the abutting portion (40) of the holder (30) by pivoting the tapered web (16) in the locking groove (38).

23. Method according to embodiment 21 or 22, wherein the supporting section (14) is formed ball-shaped and is received in the ball socket-like abutting portion (40) so that forces between the coupling bolt (10) and the holder (30) are transferred partly areally.

24. Method according to one of the embodiments 21 to 23, comprising the further step:
    Creating (S4) a further connection between the first (B1) and the second component (B2) at the end of the pivoting movement, preferably by means of a plug-in coupling.

25. A first (B1) and a second component (B2) which are connected to each other by means of at least one coupling according to one of the embodiments 1 to 11.

26. The first (B1) and the second component (B2) according to embodiment 25, which are further connected by means of a plug-in coupling.

LIST OF REFERENCE SIGNS

B1, B2 component
10 coupling bolt
12 fastening end
13 hexagon profile
14 supporting section
16 web
17 bottom side of the holding head
18 holding head
30 holder
32 keyhole
34 edge
36 inserting section
38 locking groove
36 first areal segment
40 abutting portion
40a second areal segment
42 fastening web
44 lateral surface
60 plug-in coupling, threading, locking mechanism, snap-in locking mechanism
S1 inserting
S2 pivoting
S3 spring pre-tensioning
$r_{39}, r_{40a}$ inner radius

The invention claimed is:

1. Coupling by means of which a first and a second component are connectable to each other, comprising the following features:
   a. a coupling bolt comprising a fastening end, a holding head and a supporting section arranged therebetween, in which the holding head and the supporting section are connected to each other by a web, which is tapered with respect to the holding head and the supporting section, and the fastening end is fastenable at the first component,
   b. a holder having a keyhole and an abutting portion in which an edge of the keyhole encloses a non-planar surface, wherein the abutting portion consists of at least a second and a first areal segment, which each face the supporting section and which are arranged at least partly symmetrically around the lockingly arrangeable coupling bolt, and wherein the abutting portion is formed at least two-staged with respect to a longitudinal axis of a coupling bolt, which can be arranged in the keyhole in a locked manner, so that the abutting portion between the holding head and the supporting section of the coupling bolt is mechanically braceable, and wherein the coupling bolt is lockable in a form-fit manner in the keyhole by an inserting-pivoting-movement and the holder is fastenable at the second component by a fastening structure, wherein c. the holding head and the supporting section protrude in radial or lateral direction beyond a cross-section of the web, and each form an undercut in longitudinal direction of the coupling bolt so that the holder may be supported at the holding head and the supporting section of the locked coupling bolt in opposite directions, wherein one of d1, d2, and d3 are satisfied:

d1. the areal segments of the abutting portion are formed ball-shaped and a radius of the first ball-shaped areal segment is smaller than a radius of the second ball-shaped areal segment and in which the first ball-shaped areal segment is arranged adjacent to the keyhole, or d2. the first areal segment is formed conically or ball-shaped and the second areal segment is formed conically or ball-shaped, wherein in the case of two conical areal segments, a cone angle of the first areal segment is smaller than a cone angle of the second areal segment, or d3. the first areal segment is formed ball-shaped having a diameter which is smaller than a diameter of the supporting section, and in which the second areal segment is formed truncated cone-like so that the supporting section is tangentially engageable by the second areal segment.

2. Coupling according to claim 1, in which the keyhole comprises an inserting section and a locking groove, in which the inserting section forms a through-passage portion for the holding head of the coupling bolt and a width of the locking groove is smaller than a diameter of the holding head and larger than a thickness of the tapered web.

3. Coupling according to claim 2, in which the abutting portion of the holder is adapted to the shape of the supporting section of the coupling bolt so that the coupling bolt and the holder support each other at least partly in the locked condition.

4. Coupling according to claim 3, in which the abutting portion has the shape of a ball socket, in a lateral surface of which the keyhole is formed.

5. Method for connecting a first and a second component by a form-fit working coupling, comprising the following features: a coupling bolt comprising a fastening end, a holding head and a supporting section arranged therebetween, in which the holding head and the supporting section are connected to each other by a web which is tapered with respect to the holding head and the supporting section, wherein the holding head and the supporting section protrude in radial or lateral direction beyond a cross-section of the web, and the fastening end is fastenable at the first component and a holder having a keyhole and an abutting portion, in which an edge of the keyhole encloses a non-planar surface, the coupling bolt is lockable in a form-fit manner in the keyhole by an inserting-pivoting-movement and the holder is fastenable at the second component by a fastening structure, wherein the method comprises the following steps:

a. inserting the holding head into an inserting section of the keyhole so that the supporting section abuts the holder, and b. pivoting the coupling bolt relative to the holder so that the tapered web between the holding head and the supporting section is arranged at least in a form-fit manner in a locking groove of the keyhole so that the holding head and the supporting section each form an undercut in longitudinal direction of the coupling bolt and the holder may be supported at the holding head and the supporting section of the coupling bolt in opposite directions wherein the supporting section is formed ball-shaped and is received in a ball socket-like abutting portion so that forces between the coupling bolt and the holder are transferred partly areally.

6. Method according to claim 5, having the further step: spring pre-tensioning the supporting section of the coupling bolt against the abutting portion of the holder by pivoting the tapered web in the locking groove.

7. Method according to claim 6, wherein the supporting section is formed ball-shaped and is received in the ball socket-like abutting portion so that forces between the coupling bolt and the holder are transferred partly areally.

8. Method according to claim 6, comprising the further step:

Creating a further connection between the first and the second component at the end of the pivoting movement, preferably by a plug-in coupling.

9. A first and a second component which are connected to each other, comprising the following features:

a. a coupling bolt comprising a fastening end, a holding head and a supporting section arranged therebetween, in which the holding head and the supporting section are connected to each other by a web which is tapered with respect to the holding head and the supporting section, and the fastening end is fastenable at the first component, b. a holder having a keyhole and an abutting portion in which an edge of the keyhole encloses a non-planar surface, wherein the abutting portion consists of at least a second and a first areal segment, which each face the supporting section and which are arranged at least partly symmetrically around the lockingly arrangeable coupling bolt, and wherein the abutting portion is formed at least two-staged with respect to a longitudinal axis of a coupling bolt, which can be arranged in the keyhole in a locked manner, so that the abutting portion between the holding head and the supporting section of the coupling bolt is mechanically braceable, and wherein the coupling bolt is lockable in a form-fit manner in the keyhole by an inserting-pivoting-movement and the holder is fastenable at the second component by a fastening structure, wherein c. the holding head and the supporting section protrude in a radial or lateral direction beyond a cross-section of the web, and each form an undercut in a longitudinal direction of the coupling bolt so that the holder may be supported at the holding head and the supporting section of the locked coupling bolt in opposite directions, wherein d1. the areal segments of the abutting portion are formed ball-shaped and a radius of the first ball-shaped areal segment is smaller than a radius of the second ball-shaped areal segment and in which the first ball-shaped areal segment is arranged adjacent to the keyhole, or d2. the first areal segment is formed conically or ball-shaped and the second areal segment is formed conically or ball-shaped, wherein in the case of two conical areal segments, a cone angle of the first areal segment is smaller than a cone angle of the second areal segment, or d3. the first areal segment is formed ball-shaped having a diameter which is smaller than a diameter of the supporting section, and in which the second areal segment is formed truncated cone-like so that the supporting section is tangentially engageable by the second areal segment.

10. The first and the second component according to claim 9, which are further connected by a plug-in coupling.

* * * * *